United States Patent [19]

Hergenrother et al.

[11] Patent Number: 5,346,962

[45] Date of Patent: Sep. 13, 1994

[54] ELASTOMERS HAVING REDUCED HYSTERESIS PREPARED WITH VINYL IMIDAZOLE

[75] Inventors: William L. Hergenrother, Akron, Ohio; Martin E. Morrow, Muscatine, Iowa

[73] Assignee: Bridgestone/Firestone, Inc., Akron, Ohio

[21] Appl. No.: 145,128

[22] Filed: Nov. 3, 1993

[51] Int. Cl.$^5$ .......................................... C08F 271/02
[52] U.S. Cl. .................................. 525/281; 525/244; 525/250
[58] Field of Search ........................................ 525/281

[56] References Cited

U.S. PATENT DOCUMENTS

| | | |
|---|---|---|
| 3,177,190 | 4/1965 | Hsieh et al. |
| 3,451,988 | 6/1969 | Langer et al. |
| 4,015,061 | 3/1977 | Schulz et al. |
| 4,264,753 | 4/1981 | Halasa et al. |
| 4,429,091 | 1/1984 | Hall et al. |
| 4,614,771 | 9/1986 | Wanatabe et al. |
| 4,616,069 | 10/1986 | Wanatabe et al. |
| 5,001,196 | 3/1991 | Kawanaka et al. ............... 525/281 |
| 5,109,907 | 5/1992 | Stayer, Jr. et al. |
| 5,151,469 | 9/1992 | Hergenrother et al. |
| 5,210,144 | 5/1993 | Lawson et al. |
| 5,210,145 | 5/1993 | Lawson et al. |

OTHER PUBLICATIONS

T. A. Antkowiak, et al, "Temperature and Concentration Effects on Polar-Modifier Alkyllithium Polymerization and Copolymerization", Journal of Polymer Science, Part A-1, vol. 10, pp. 1319–1334 (1972).

D. N. Schulz, et al, "Anionic Polymerization Initiators Containing Protected Functional Groups and Functionally Terminated Diene Polymers", Journal of Polymer Science, Polymer Chemistry Edition, vol. 12, pp. 153–166 (1974).

*Primary Examiner*—Bernard Lipman
*Attorney, Agent, or Firm*—Daniel N. Hall

[57] ABSTRACT

A tire treadstock elastomer having reduced hysteresis is prepared by (1) preparing a living polymer by anionic polymerization of a conjugated diene or copolymerization of a conjugated diene with a monovinyl aromatic hydrocarbon, (2) endcapping the living polymer with at least one equivalent, preferably 3 to 15 equivalents, of a 1-vinylimidazole or 1-vinylbenzimidazole, preferably 1-vinylimidazole; (3) quenching and recovering the endcapped polymer and (4) curing the endcapped polymer using a conventional rubber curing recipe to form an elastomer having reduced hysteresis. This elastomer either alone or blended with a conventional treadstock rubber may form a tire treadstock.

19 Claims, No Drawings

ELASTOMERS HAVING REDUCED HYSTERESIS PREPARED WITH VINYL IMIDAZOLE

TECHNICAL FIELD

This invention relates to elastomers having reduced hysteresis, to endcapped polymers which on curing yield such elastomers, to anionic polymerization processes for preparing such endcapped polymers and elastomers, and to tires and other articles formed from such elastomers.

BACKGROUND OF THE INVENTION

In the art, it is desirable to produce elastomeric compounds exhibiting reduced hysteresis. Such elastomers, when compounded to form articles such as tires, power belts and the like, will show an increase in rebound, a decrease in rolling resistance and will have less heat build-up when mechanical stresses are applied.

The main source of hysteretic power loss has been established to be due to the section of the polymer chain from the last cross link of the vulcanized to the end of the polymer chain. This free end cannot be involved in an efficient elastically recoverable process, and as a result, any energy transmitted to this section of the cured sample is lost as heat. It is known in the art that this type of mechanism can be reduced by preparing higher molecular weight polymers which will have fewer end groups. However, this procedure is not useful because processability of the rubber with compounding ingredients and during shaping operations decreases rapidly with increasing molecular weight.

Another method of reducing hysteresis has been to react a lithium endcapped elastomer with a tin chloride compound to give a polymer terminated with a tin compound. Tin has an affinity for carbon black, which affinity reduces hysteresis by removing the effect of a free end. The present invention makes use of endcapped polymers which provide for even further reduction of hysteresis during the curing of the elastomer.

Other additives or endcapping agents have been used to react with the carbon-lithium bond to reduce hysteresis characteristics. These have included heavy metal compounds and other organic compounds containing polar groups such as amines, amides, esters, ketones and various combinations thereof. Still other additives or endcapping agents are sulfoxides as disclosed in U.S. Pat. No. 5,151,469, and certain fused ring polynuclear aromatic compounds having three or more fused rings, such as benzanthrone, 9-vinylanthracene and vinyl-phenanthrenes, as disclosed in U.S. Pat. No. 5,210,145.

DISCLOSURE OF THE INVENTION

It is an object of this invention to provide an endcapped polymer which on cure with conventional rubber curing agents yields an elastomer having reduced hysteresis characteristics.

It is a further object of this invention to prepare such endcapped polymer by reacting a living polymer with an endcapping agent.

It is a still further object of this invention to provide an elastomer having reduced hysteresis characteristics.

Still another object of the present invention is to provide an improved tire having decreased rolling resistance.

In accordance with this invention, endcapped polymers which are curable to elastomers having reduced hysteresis are provided. These endcapped polymers are diene polymers and copolymers containing terminals or endcapping groups derived from vinyl substituted imidazoles or benzimidazoles. The polymers are prepared by reacting a living polymer obtained by anionic polymerization of at least one diene monomer or mixture of at least one diene monomer and at least one vinyl aromatic hydrocarbon monomer with at least about one equivalent of an endcapping agent which is an N-vinyl substituted imidazole or benzimidazole. The resultant terminally functionalized or endcapped polymers have reduced hysteresis properties in the carbon black reinforced and cured state and can be utilized to form elastomer compositions for tire treads having reduced rolling resistance.

DETAILED DESCRIPTION OF THE INVENTION

The term "living polymer" as employed throughout the specification and claims refers to polymers which are prepared by anionic polymerization of a diene monomer or mixture of a diene monomer and a vinyl aromatic hydrocarbon monomer using an initiator such as an organolithium compound. The resultant polymer contains active terminals (e.g., lithium terminals) which can be subjected to terminating reactions.

The term "hysteresis" as employed throughout the specification refers to the heat generating properties of a vulcanized elastomer or rubber composition. An art recognized measurement of the hysteresis of an elastomer composition is the tan delta value of the vulcanized composition. Low tan delta values at 50° to 65° C., are indicative of low hysteresis and, consequently, tires formed from such elastomer compositions have lower rolling resistance.

As will become apparent from the description which follows, the present invention provides novel elastomer polymers endcapped with an N-vinyl substituted imidazole or benzimidazole. It has been discovered herein that vulcanizable elastomeric compounds and articles thereof based upon such endcapped elastomer polymers exhibit useful properties, particularly the property of reduced hysteresis. When compounded to make products such as tires, power belts and the like, these vulcanizable elastomeric compounds exhibit increased rebound, decreased rolling resistance and less heat build-up during periods of applied mechanical stress.

The elastomer polymers according to the present invention are any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers and copolymers thereof with monovinyl aromatic polymers. Suitable monomers for forming elastomers of the present invention include conjugated diolefins having from about 4 to about 12 carbon atoms and monovinyl aromatic monomers having 8 to 18 carbon atoms and trienes. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, alphamethylstyrene, p-methylstyrene, vinyltoluene and vinylnapthalene.

The elastomer polymer results from an anionic polymerization employing any suitable anionic polymerization initiator and resulting in a living polymer having at least one functional site. For example, one preferred initiator is butyl lithium which results in an elastomer having a carbon-lithium bond. Other examples of useful polymerization initiators include sec-butyl lithium, t-butyl lithium, allyl lithium, methyl lithium, dodecyl lithium, tributyl tin lithium, and the like.

Polymerization is usually conducted in batch in a conventional solvent for anionic polymerizations such as hexane, cyclohexane, benzene and the like. The solvent is non-polar and is preferably a hydrocarbon. Other techniques for polymerization, such as semi-batch and continuous polymerization may be employed. In order to promote randomization in copolymerization and to control vinyl content, a polar coordinator may be added to the polymerization ingredients. The amount depends on the amount of vinyl desired, the level of styrene employed and the temperature of the polymerization, as well as the nature of the specific polar coordinator (modifier) employed.

Polar modifiers (or polar coordinators) which may be utilized to control the 1,2-microstructure content of the living diene polymers or copolymers and to effect randomization of the copolymers may be any of those heretofore known in the diene polymer or copolymer art to be useful for that purpose. Suitable polar modifiers include ethers such as tetrahydrofuran (THF), tetrahydropyran, 1,4-dioxane, monoglycol methyl ether (monoglyme), diglycol methyl ether (diglyme), triglycol methyl ether (triglyme) and the oligomeric oxolanyl alkane compounds described in U.S. Pat. No. 4,429,091 such as bis(2-oxolanyl)ethane; 2,2-bis(2-oxolanyl)propane; 1,1-bis(2-oxolanyl)ethane; 2,2-bis(5-methyl-2-oxolanyl)propane and the like and tertiary amine compounds such as triethyl amine, tripropyl amine, tributyl amine, N,N,N',N'-tetramethylethylene diamine (TMEDA), dipiperidino ethane, and the like. The preferred polar modifiers are TMEDA and the oligomeric oxolanyl propanes.

The living random copolymers of conjugated dienes and vinyl aromatic hydrocarbons utilized to prepare copolymers of the invention may have diene contents of from 100 to about 20 percent by weight and vinyl aromatic hydrocarbon contents of from 0 to about 80 percent by weight with the preferred copolymers having diene contents of from 90 to 50 percent by weight and vinyl aromatic hydrocarbon contents of from 10 to 50 percent by weight.

The living polymers of conjugated dienes and random copolymers of conjugated dienes and vinyl aromatic hydrocarbons employed to prepare the polymers and copolymers of the invention may have 1,2-microstructure contents ranging from about 10 to about 80 percent with the preferred polymers or copolymers having 1,2-microstructure contents of from 15 to 65 percent. The preparation of diene polymers or copolymers having a particular 1,2-microstructures content is dependent on a number of factors including the specific initiator, the type polar modifier, the modifier to initiator ration and the polymerization temperature.

Illustrative methods of preparing diene polymers and copolymers having 1,2-microstructure contents ranging from 15 to 90 percent or more are described in numerous patents and publications including U.S. Pat. Nos. 3,451,988 and 4,264,753; and the publication "Temperature and Concentration Effects on Polar-Modifier Alkyllithium Polymerization and Copolymerization", Journal of Polymer Science, Part A-1, Vol. 10, pages 1319-1334 (1972); the disclosures of which are incorporated herein by reference.

One of ordinary skill in the polymerization arts can, by utilizing the disclosures of the incorporated patents and publication, readily determine the type initiator, the type polar modifier, the necessary modifier-initiator ration and polymerization conditions necessary to obtain a living diene polymer or copolymer having the desired 1,2-microstructure content.

A batch polymerization is begun by charging a blend of monomer(s) and solvent to a suitable reaction vessel, followed by the addition of the polar coordinator (if employed) and the initiator compound previously described. The reactants are heated to a temperature of from about 0° C. to about 200° C., and the polymerization is allowed to proceed for from about 0.1 to about 24 hours. This yields a living polymer.

The living polymer is then terminated or "endcapped" by the addition of at least about one equivalent of a polymerizable N-vinyl substituted imidazole or N-vinyl substituted benzimidazole as endcapping agent. Suitable endcapping agents for the practice of this invention may be represented by either formula (I) or formula (II) below.

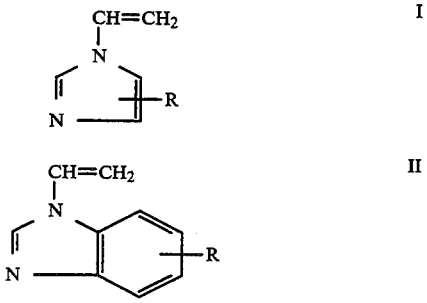

In the above formulas, R is hydrogen, lower alkyl, substituted lower alkyl, phenyl or substituted phenyl. This group should be non-reactive and in particular non-polymerizable under reaction conditions used in endcapping. R is preferably hydrogen or lower alkyl, most preferably hydrogen. The preferred endcapping agent is 1-vinylimidazole. Another endcapping agent giving similar results is 1-vinylbenzimidazole.

Preferred amounts of endcapping agent are from about one to about 15 equivalents. The number of equivalents of endcapping agent as expressed herein is equivalents of endcapping agent per equivalent of lithium (or other metal) ion in the polymerization initiator. The lithium ion and the living polymer are present in a 1:1 equivalent ratio as is known in the living polymer art. In fact, as is also known in the living polymer art, the average molecular weight of the living polymer obtained varies inversely as the ratio of equivalents of initiator per weight (expressed in grams) of monomer charge.

The endcapping agent reacts with the living polymer (or anionic polymer) to form a either a vinylimidazole (or vinyl benzimidazole) end group or short chain polymeric end block, depending on the quantity of 1-vinylimidazole (or 1-vinyl benzimidazole) which reacts with the living polymer. The course of reaction in any case may be represented by Equation [1] below.

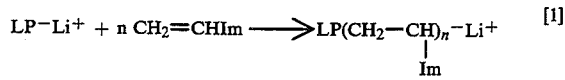

In Equation [1], LP denotes a living polymer anion (a polymer minus a terminal hydrogen atom); Im denotes an imidazolyl or benzimidazole residue, i.e., a compound of formula (I) or formula (II) minus the vinyl group; and n (which denotes average chain length) is at least about 1 and is preferably about 3 to about 15. The polymer solution becomes quite viscous as the polymerization reaction proceeds. Endcapped polymer solutions obtained herein have viscosities similar to that of rubber cement and accordingly may be referred to as "cements".

It will be noted that the endcapped polymer, which is shown on the right side of Equation [1], is a block copolymer in which the living polymer forms the polymer backbone and the short chain polymer formed from the endcapping agent forms an end block when n is greater than one. When n is 1, the endcapped polymer is simply a terminated or end functionalized adduct in which 1-vinyl imidazole or 1-vinylbenzimidazole forms an end group.

After the terminating reaction is complete, it is generally desirable to quench the polymer mixture in order to deactivate any live alkali metal end groups (e.g., lithium end groups) which may remain.. This serves to prevent the living polymer from reacting with any carbon dioxide or oxygen which may be present. The quenching reaction can be conducted in known manner by adding a conventional polymer terminating agent such as water or an alcohol (e.g., isopropanol) to the polymer solution.

The endcapped polymer may be separated from the solvent by conventional techniques. These include steam or alcohol coagulation, thermal desolventization, or any other suitable method. Additionally, solvent may be removed from the resulting polymer by drum drying, extruder drying, vacuum drying or the like.

It is believed that the endcapped polymers according to the present invention react predominately during cure with carbon black rather than during mixing like those polymers prepared with those conventional endcapping agents heretofore known in the art. Because free end groups cause an increase in hysteresis, the present invention effectively reduces hysteresis.

The polymers of the present invention can be used alone or in combination with other elastomers to prepare a tire treadstock compound. For example, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene/acrylic rubber, ethylene/vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely such as between 10 and 99 percent by weight, depending upon the amount of hysteresis reduction desired.

The polymers can be compounded with carbon black in mounts ranging from about 20 to about 100 parts by weight, per 100 parts of rubber (phr), with about 40 to about 70 phr being preferred. The carbon blacks may include any of the commonly available, commercially-produced carbon blacks but those having a surface area (EMSA) of at least 20 $m^2$/gram or higher are preferred. Surface area values used in this application are those determined by ASTM D 1765 using the cetyl-trimethylammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. See, for example, *The Vanderbilt Rubber Handbook*, pp 408–424, R. T. Vanderbilt Co., Norwalk, Conn. 06855 (1979). Other carbon blacks which may be utilized include acetylene blacks. Mixtures of two or more of the above blacks can be used in preparing the products of the invention. Typical values for surface areas of usable carbon blacks are summarized in the following Table I.

TABLE I

| Carbon Blacks | |
|---|---|
| ASTM Designation (D 1765-82a) | Surface Area ($m^2$/g) (D 3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred. The reinforced rubber compounds can be cured in a conventional manner with known vulcanizing agents in amounts of from about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365-468, particularly "Vulcanization Agents and Auxiliary Materials", pp. 390-402. Vulcanizing agents may be used alone or in combination.

Silica can be used as a total or partial replacement for carbon black as the reinforcing filler if desired. Carbon black is the preferred reinforcing material for tire treads. Silica is useful as a reinforcing filler in place of carbon black when an article which is not black is desired. Quantities of silica may be in accordance with recipes known in the art. The quantity of silica will usually be from about 5 to about 100 phr with 10 to 50 phr preferred.

Vulcanizable elastomeric compositions of the invention can be prepared by compounding or mixing the polymers thereof with carbon black, silica or both, and other conventional rubber additives such as fillers, plasticizers, antioxidants, curing agents and the like, using standard rubber mixing equipment and procedures and conventional amounts of such additives. Such elastomeric compounds when vulcanized using conventional rubber vulcanization conditions have reduced hysteresis properties and are particularly adapted for use as tread rubbers for tires having reduced rolling resistance.

GENERAL EXPERIMENTAL

In order to demonstrate the preparation and properties of elastomers prepared according to the present invention, a styrene/butadiene rubber (SBR) was prepared employing a suitable polymerization initiator, as will be more fully discussed hereinbelow. A control sample of the prepared polymer was isolated, and the remaining polymer was endcapped with 1-vinylimidazole according to the invention. As noted above, various techniques known in the art for carrying out polymerizations may be employed without departing from the scope of the present invention.

Both the control and the invention polymer samples of each example were then tested for tensile strength (psi), percent elongation, Mooney viscosity at 100° C., tan delta (at both 24° C. and 65° C.), and the change in tan delta of the invention polymer as compared to the control polymer was calculated. Tan delta was determined on a Rheometrics stress rheometer at 0.5 Hz. Each compounded polymer was also tested for rebound by employing the industry standard ball drop test.

All percentages throughout the specification (including the examples) are by weight unless the contrary is stated.

EXAMPLE 1

To a clean dry nitrogen purged 5-gallon reactor vessel, 2295 grams (5.06 pounds) of a 33 percent styrene in hexane blend and 7983 grams (17.6 pounds) of a 24.5 percent butadiene in hexane blend was added. This corresponds to 28% styrene and 72% butadiene, both by weight. There was also added 20.2 millimoles (3.73 cubic centimeters or "cc") of a 5.42M hexane solution of 2-2'-bis(oxolanyl)propane (a polar coordinator) and 25.2 millimoles (16.81 cc) of 1.5M hexane solution of butyl lithium as a polymerization initiator. (This represents 21.7 millimoles for polymerization and 3.5 millimoles for blend impurities.) The temperature in the reactor vessel was maintained at 49° C. for 3 hours. After 3 hours polymerization was complete. Approximately 5 Kg (11.1 pounds) of the polymer product (about one-half the total quantity) was removed to be used as a control polymer in the ensuing tests. This portion was coagulated in isopropanol (which terminates the reaction) and drum dried to give a composition containing 28.2% by weight styrene, balance polybutadiene. The polybutadiene (PBD) portion contained 47.7% vinyl, 20.9% cis and 31.4% trans. The polymer had a number average molecular weight $M_n$ of 113,100, and a $M_w/M_n$ ratio of 1.28.

To the remaining polymer in the reaction vessel was added 5.7 grams (59.3 millimoles) of 1-vinylimidazole dissolved in dry toluene which had been purified by passing over activated alumina prior to use. This represents about 6 times the equivalent quantity of initiator. After reaction for one hour at 49° C., the polymer was isolated by adding it to isopropyl alcohol and drum drying. Analysis of this polymer showed 28.2 percent styrene content with 47.7 percent vinyl polybutadiene, 20.9 percent cis-polybutadiene and 31.4 percent trans-polybutadiene.

The endcapped polymer according to the invention was found to have a number average molecular weight of 114,200 and a molecular weight distribution ($M_n/M_n$) of 1.32. Determinations were by gel permeation chromatography (GPC).

Elemental analysis of the invention polymer showed 0.05%N, which represents a content of 0.168% by weight of 1-vinylimidazole in the SBR (about 33% incorporation). Incomplete incorporation of 1-vinylimidazole into the polymer is believed to be due to the short reaction time. Substantially complete incorporation of 1-vinylimidazole is believed to be attainable if the reaction time is sufficiently long.

The control polymer (Control Polymer 1) and the invention polymer (Invention Polymer 1) were each compounded into conventional treadstock formulation. The treadstock formulation included 100 parts of the rubber being tested, 50 phr ASTM N 399 carbon black, 3 phr zinc oxide, 1.8 phr sulfur, 2 phr stearic acid, 1 phr antioxidant/antiozonant (Santoflex 13) and 1 phr accelerator (Santocure NS). (Both "Santoflex" and "Santocure" are registered trademarks of Monsanto Company, St. Louis, Mo., U.S.A.) This compound was then cured for 30 minutes at 150° C. Physical properties of each compound are reported in Table II hereinbelow.

TABLE II

Hysteresis Properties of Rubber Compounds of Example 1

|  |  | Control Polymer 1 | Invention Polymer 1 |
| --- | --- | --- | --- |
| tensile strength | 23° C. | 2393 | 2490 |
| percent elongation[a] |  | 295 | 268 |
| Shore A[b] |  | 74 | 74 |
| rebound, % | 23° C. | 34.0 | 36.6 |
|  | 65° C. | 57.8 | 62.2 |
| tan δ at | 25° C. | 0.1950 | 0.1607 |
| 7% elongation | 65° C. | 0.1313 | 0.1021 |
| Δ tan δ[c] | 25° C. | — | −17.6 |
|  | 65° C. | — | −22.2 |

[a] percent elongation at break
[b] Shore A hardness
[c] percent change from Control Polymer 1

With respect to the data reported in Table II, it is noted that Invention Polymer 1 showed a percent rebound of 36.6 and 62.2 at 23° C. and 65° C., respectively, while Control Polymer 1 showed a percent rebound of 34.0 and 57.8 respectively. The improvement in rebound would suggest a corresponding decrease in tan delta, which was confirmed by the tan delta data.

At both 23° C. and 65° C. tests, tan delta for Invention Polymer 1 was found to be superior to that of Control Polymer 1. The lower the tan delta number, the lower are the hysteresis properties of the sample.

These data show that the polymer prepared according to the invention by endcapping the SBR polymer with a short chain polymer end block provided the result of a reduction in hysteresis in the elastomeric compound upon cure. Control Polymer 1 was found to have a tan delta of 0.1950 and 0.1313 at 25° C. and 65° C., respectively, while Invention Polymer 1 was found to have a tan delta of 0.1607 and 0.1021 respectively.

EXAMPLE 2

This example, when compared with Example 1, shows that the improvement in tan delta values, which correlate with lower hysteresis in a cured rubber increases as the quantity of 1-vinylimidazole (endcapping agent) is increased.

The monomer feed in this example contained about 28% styrene and 72% 1,3-butadiene, both by weight (same as in Example 1).

The quantity of 1-vinylimidazole in Example 2 was 3 times the equivalent quantity. "Equivalent quantity" denotes one milliequivalent (in this case one millimole)

of endcapping agent for each milliequivalent (in this case one millimole) of lithium in the initiator.

Materials, amounts, procedures, reaction conditions and compounding recipes were the same as in Example 1 with the exception of the quantity of endcapping agent as noted above. Both control and invention (or experimental) polymers (the control polymer having no endcapping agent) were prepared in each example.

Analysis showed that both polymers contained 27.8% styrene. The polybutadiene contents were: 28.6% vinyl polybutadiene, 25.6% cis-polybutadiene and 45.7% trans-polybutadiene.

The invention polymer (Invention Polymer 2) had a number average molecular weight ($M_n$) of 162,000. Elemental analysis of the invention polymer showed 0.003% N.

The control polymer (Control Polymer 2) had a number average molecular weight ($M_n$) of 144,000.

Physical properties are shown in Table III below.

TABLE III

Hysteresis Properties of Rubber Compounds of Example 2

|  |  | Control Polymer 2 | Invention Polymer 2 |
|---|---|---|---|
| tensile strength | 23° C. | 2756 | 2733 |
| percent elongation[a] |  | 323 | 322 |
| Shore A[b] |  | 75 | 75 |
| rebound, % | 23° C. | 48.2 | 48.2 |
|  | 65° C. | 60.6 | 61.4 |
| tan δ at | 25° C. | 0.1901 | 0.1828 |
| 7% elongation | 65° C. | 0.1560 | 0.1427 |
| Δ tan δ[c] | 25° C. | — | −3.8 |
|  | 65° C. | — | −8.5 |

[a]percent elongation at break
[b]Shore A hardness
[c]percent change from Control Polymer 1

EXAMPLE 3

This example illustrates the use of tribulytin lithium as the polymerization initiator.

The endcapping agent was 1-vinylimidazole and the amount thereof was 6 equivalents (same as in Example 1).

Materials, amounts, procedures, reaction conditions and compounding recipes were the same as in Example 1 with the exception of the polymerization initiator as noted above. Both control and inventor (or experimental) polymers (the control polymer having no endcapping agent) were prepared in each example.

Both control and invention polymers had number average molecular weights of 230,000. Analysis of both polymers showed 28.4% styrene with a polybutadiene content as follows: cis-polybutadiene, 25.6%; trans-polybutadiene, 46.1%; and vinyl polybutadiene, 28.2%.

Results obtained are shown in Table IV below.

TABLE IV

Hysteresis Properties of Rubber Compounds of Example 3

|  |  | Control Polymer 3 | Invention Polymer 3 |
|---|---|---|---|
| tan δ at | 25° C. | 0.1605 | 0.1549 |
| 7% elongation | 65° C. | 0.1068 | 0.1009 |
| Δ tan δ(%) [a] | 25° C. | — | −3.5 |
|  | 65° C. | — | −5.5 |

[a]percent change from Control Polymer 3

It should now be clear from the foregoing examples and specification disclosure, that elastomer compounds according to the present invention are useful for providing improvements in hysteresis characteristics. These polymers exhibit improved hysteresis properties when compared to similar polymers prepared by similar means but lacking the sulfur-containing end groups. As a result, the vulcanizable compounds containing these polymers exhibit improved hysteresis properties which provide tread compounds improved rolling resistance in tires.

It is to be understood that the invention is not limited to the specific initiators, sulfur compounds, monomers, polar coordinators or solvents disclosed herein, except as otherwise stated in the specification. Similarly, the examples have been provided merely to demonstrate practice of the subject invention and do not constitute limitations of the invention. Those skilled in the art may readily select other monomers and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. An endcapped polymer prepared by reacting a living polymer having at least one functional site with at least about one equivalent of an endcapping agent, said endcapping agent being a vinyl substituted imidazole or vinyl substituted benzimidazole,
   wherein said living polymer is formed by polymerization of a monomer or mixture thereof in solution in the present of a polymerization initiator, said monomer or mixture thereof being selected from the group consisting of conjugated dienes having from 4 to about 12 carbon atoms and mixtures of one or more said conjugated dienes with one or more monovinyl aromatic monomers having from 8 to about 18 carbon atoms.

2. An endcapped polymer according to claim 1 wherein said living polymer is a polymer of butadiene or a copolymer of butadiene and styrene.

3. An endcapped polymer according to claim 1 wherein said polymerization initiator is a lithium alkyl or a trialkyl tin lithium.

4. An endcapped polymer according to claim 3 wherein said polymerization initiator is n-butyllithium.

5. An endcapped polymer according to claim 3 wherein said polymerization initiator is tributyltin lithium.

6. An endcapped polymer according to claim 1 wherein said solution further comprises a solvent selected from the group consisting of hexane, cyclohexane and benzene.

7. An endcapped polymer according to claim 1 wherein said endcapping agent is 1-vinylimidazole.

8. An endcapped polymer according to claim 1 wherein the amount of said endcapping agent is from about 3 to about 15 equivalents.

9. An endcapped polymer comprising;
   (a) a polymer backbone, said backbone being a polymer of one or more conjugated dienes having from 4 to about 12 carbon atoms or a copolymer of one or more conjugated dienes having from 4 to about 12 carbon atoms with one or more monovinyl aromatic monomers having from 8 to about 18 carbon atoms; and
   (b) an end group, said end group being a vinyl imidazolyl or vinyl benzimidazotyl group or short chain polymer thereof.

10. An endcapped polymer according to claim 9 wherein said end group is a short chain polymer of 1-vinylimidazole having an average chain length of about 3 to about 15 monomer units.

11. A process for preparing an endcapped polymer which comprises reacting a living polymer having at least one functional site with at least one equivalent of an endcapping agent, said endcapping agent being a vinyl substituted imidazole or vinyl substituted benzimidazole, wherein said living polymer is formed by polymerization of a monomer or mixture thereof in solution in the presence of a polymerization initiator, said monomer or mixture thereof being selected from the group consisting of conjugated dienes having 4 to about 12 carbon atoms and mixtures of one or more said conjugated dienes with one or more monovinyl aromatic monomers having from 8 to about 18 carbon atoms.

12. A process according to claim 11 wherein said living polymer is a polymer of butadiene or a copolymer of butadiene and styrene.

13. A process according to claim 11 wherein said solution further comprises a solvent selected from the group consisting of hexane, cyclohexane and benzene.

14. A process according to claim 11 wherein said polymerization initiator is a lithium alkyl or a trialkyl tin lithium.

15. A process according to claim 14 wherein said polymerization initiator is n-butyl lithium.

16. A process according to claim 14 wherein said polymerization initiator is tributyltin lithium.

17. A process according to claim 11 wherein said endcapping agent is 1-vinylimidazole.

18. A process according to claim 1 wherein the amount of said endcapping agent is from about 3 to about 15 equivalents.

19. A process according to claim 11 wherein said endcapping agent forms a short chain polymeric end block on reaction with said living polymer.

* * * * *